July 7, 1970  C. BLICKENDERFER, JR., ET AL  3,519,045
METHOD FOR ALIGNING AND TRANSFERRING LOGS
Original Filed May 2, 1967  6 Sheets-Sheet 2

INVENTOR
CHARLES BLICKENDERFER JR.
BYRON B. BROOKHYSER
ROBERT SCHLIEWE

ATTORNEY

July 7, 1970  C. BLICKENDERFER, JR., ET AL  3,519,045
METHOD FOR ALIGNING AND TRANSFERRING LOGS
Original Filed May 2, 1967  6 Sheets-Sheet 3
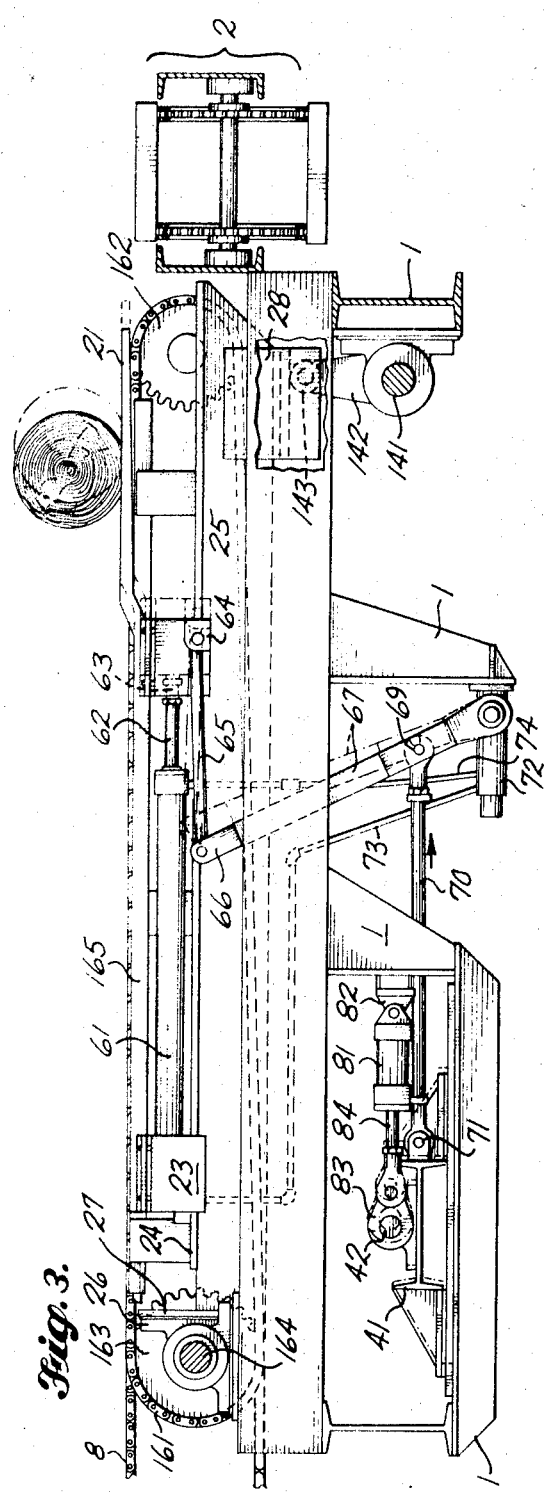
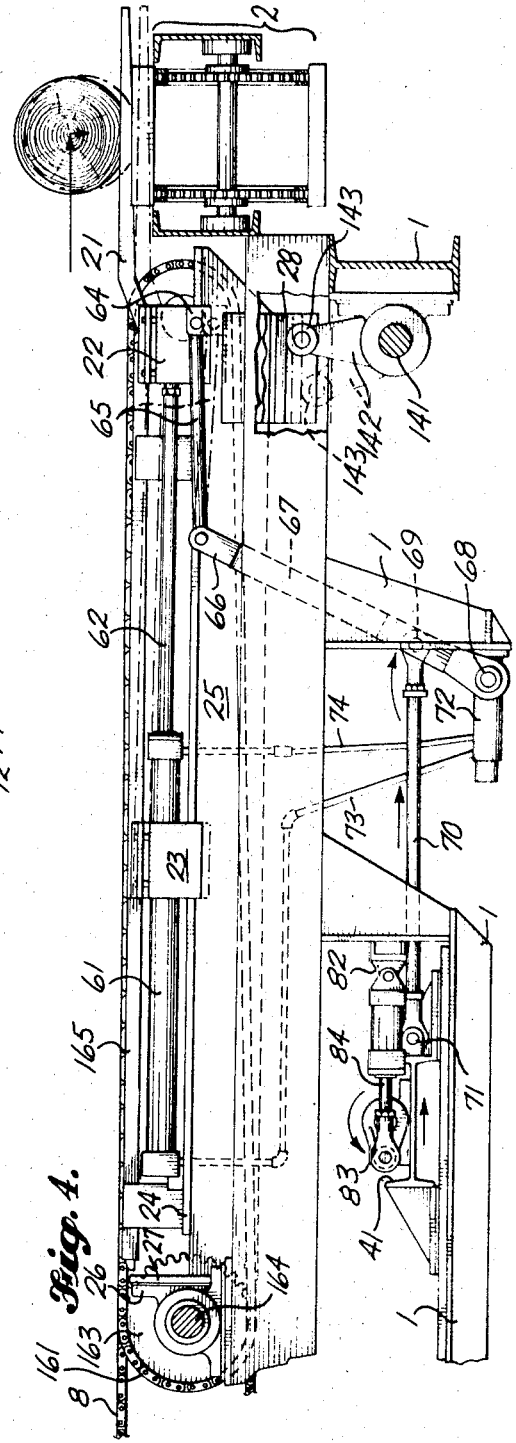
INVENTOR
CHARLES BLICKENDERFER JR.
BYRON B. BROOKHYSER
ROBERT SCHLIEWE
ATTORNEY July 7, 1970  C. BLICKENDERFER, JR., ET AL  3,519,045
METHOD FOR ALIGNING AND TRANSFERRING LOGS
Original Filed May 2, 1967  6 Sheets-Sheet 4
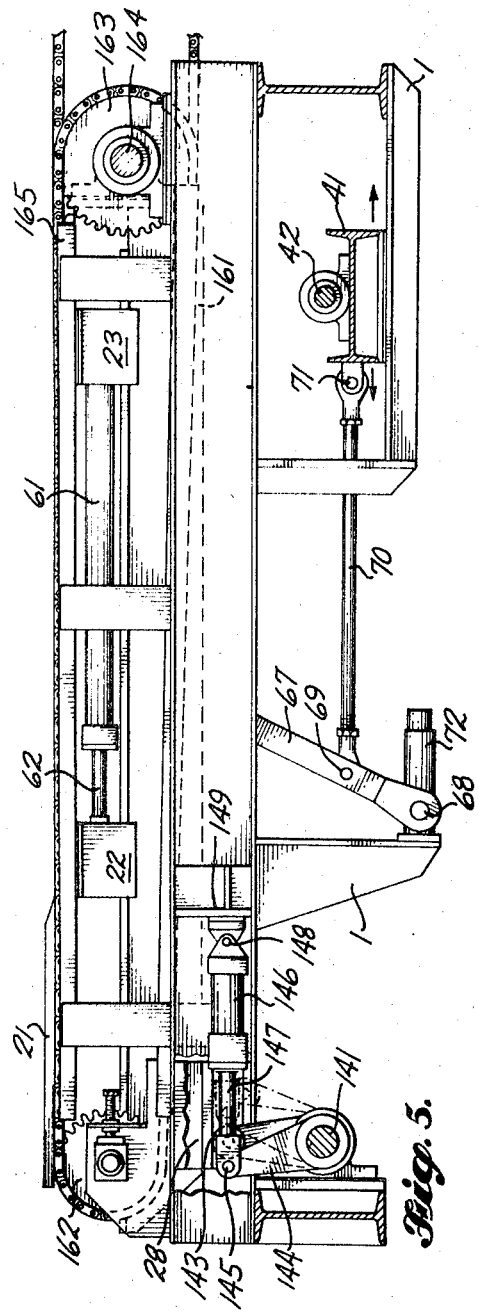
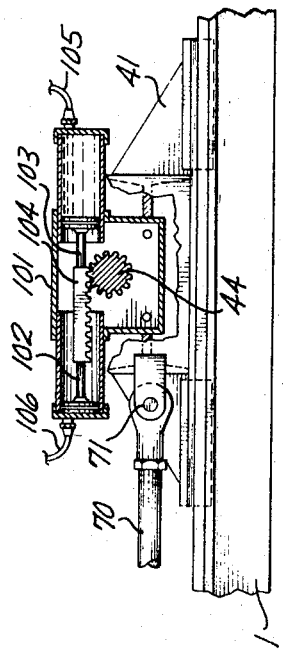
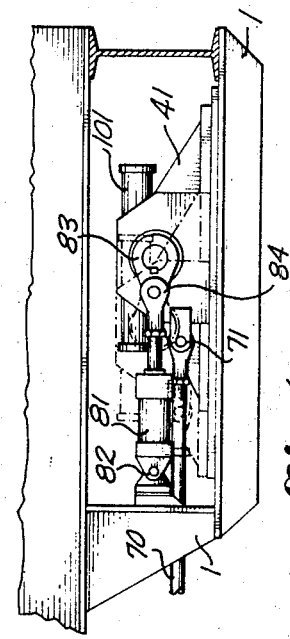
INVENTOR
CHARLES BLICKENDERFER JR.
BYRON B. BROCKHYSER
ROBERT KAHLENE
ATTORNEY

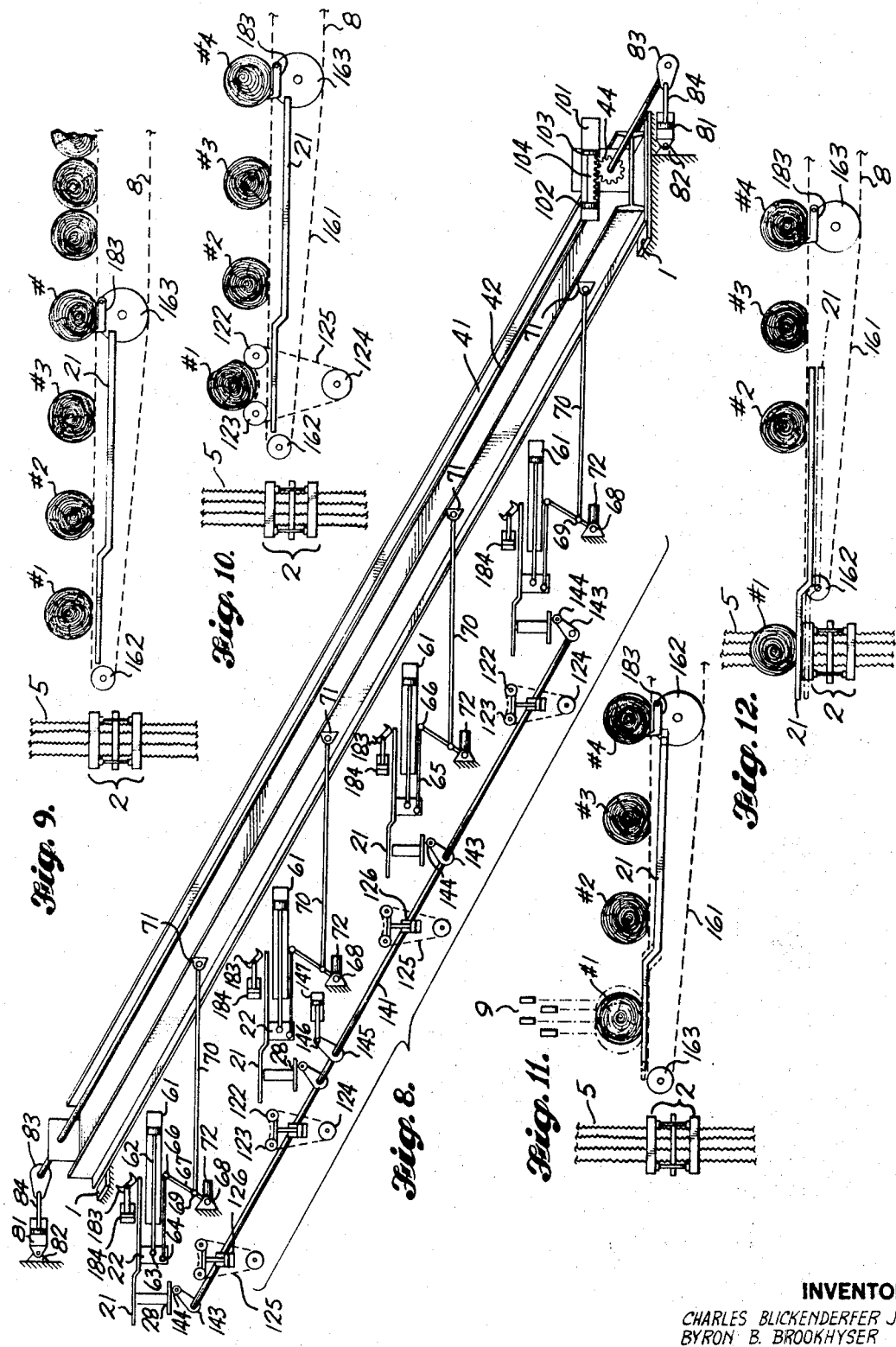

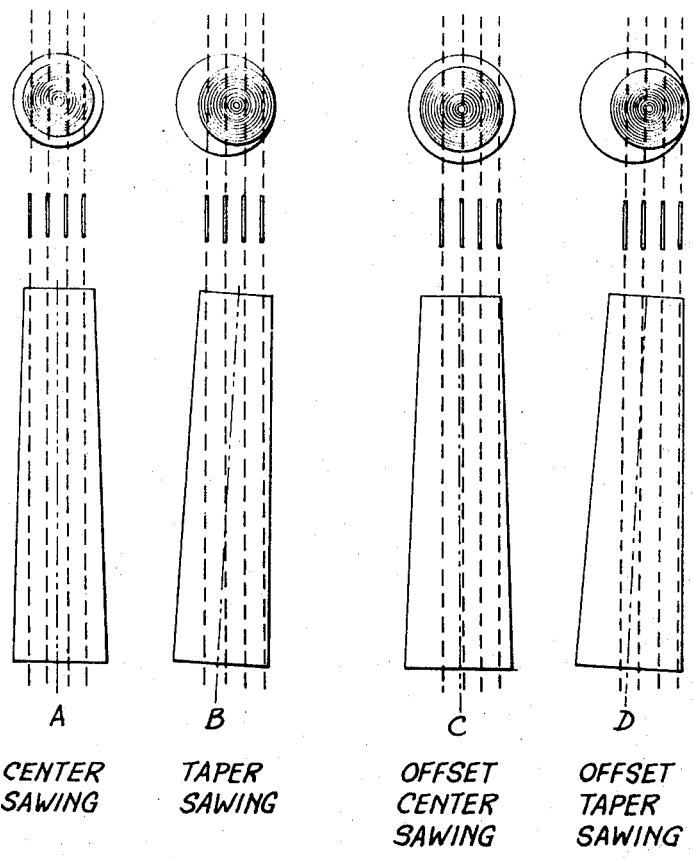

United States Patent Office 3,519,045
Patented July 7, 1970

3,519,045
METHOD FOR ALIGNING AND TRANSFERRING LOGS
Charles Blickenderfer, Jr., Puyallup, Byron B. Brookhyser, Milton, and Robert Schliewe, Tacoma, Wash., assignors to Weyerhaeuser Company, Tacoma, Wash., a corporation of Washington
Original application May 2, 1967, Ser. No. 635,517, now Patent No. 3,456,774. Divided and this application Feb. 6, 1969, Ser. No. 816,447
Int. Cl. B27b 1/00
U.S. Cl. 144—312                                              1 Claim

ABSTRACT OF THE DISCLOSURE

A method and apparatus for aligning and transferring logs to a sawing position to obtain maximum cubic recovery therefrom which comprises positioning a log to be sawed on a series of arm members disposed horizontally and at right angles to a conveyor feeding a multiple band saw, aligning the taper of the log resting on the arm members by reference to overhead shadow lights or other sawing aid representing the position of the saw blades, the alignment being by means of hydraulically operated cylinders disposed on each end of a sliding bar operatively connected to the arm members, and transferring the aligned log to the conveyor feeding the multiple band saw without substantially changing the alignment of the log by hydraulically moving the sliding bar forward a predetermined amount using the position of each of the end hydraulic cylinders as a pivot point, movement of the sliding bar causing each of the arm members to be moved forward a corresponding multiple of the distance moved by the sliding bar.

CROSS-REFERENCE TO RELATED APPLICATION

This is a division of application Ser. No. 635,517, filed May 2, 1967, now Pat. No. 3,456,774.

BACKGROUND OF THE INVENTION

As the large stands of virgin timber throughout the United States and the world are fast being depleted, it has become necessary to devise new methods and means of economically sawing "small logs," that is, logs ranging in diameter from about 8 to 25 inches. In order to economically convert these small logs into useful lumber and to maximize the yield therefrom, it is necessary to have a highly efficient operation using a minimum crew with a large volume output. Also, in order to assure consistent maximum recovery of useful lumber from a given log at relatively high efficiencies, the sawyer's function, to some extent, must be automated.

When sawing small logs the maximum yield of useful timber cannot always be achieved by consistent "center sawing," that is, sawing a log with the center line of the small end and large end of the log in the same vertical plane. By "taper sawing," "offset center sawing" or "offset taper sawing," in addition to "center sawing," the maximum amount of useful timber can be best achieved. To align a log for one of the particular methods of sawing mentioned above and transfer the aligned log to a sawing station without loss of the alignment is one of the primary purposes of this invention.

Although many devices are known for positioning or aligning timber for sawing, none is known which is adaptable for the purposes herein defined. Reference may be had to U.S. Pats. Nos. 1,132,840; 2,766,783; and 3,190,-323, for examples of prior devices used for aligning and transferring timber for sawing, and to U.S. Pat. No. 3,259,157 for a method and apparatus for producing dimentional lumber from small-diameter logs.

SUMMARY

This invention has for one of its primary objects a method and means for aligning and transferring logs to a sawing station for sawing in a way to maximize the yield of useful timber, the machine capable of large volume output with minimum sawdust. The apparatus of this invention is also readily adaptable to use in conjunction with a completely automated sawmill, if such is desired.

Roughly stated, this invention comprises a log positioning mechanism for aligning a log to be sawed and a log transfer assembly for transferring the aligned log to a feed conveyor for the saw.

BRIEF DESCRIPTION OF THE DRAWINGS

FIGS. 3 and 4 are side elevations of the apparatus. FIG. 3 shows the apparatus as it appears in operation after alignment of the log but prior to transfer of the log to the feed conveyor. FIG. 4 depicts the apparatus in operation after transfer of the log to the feed conveyor.

FIG. 5 is a sectional view along line 5—5 of FIG. 2.

FIG. 6 is an enlarged fragmentary sectional view along line 6—6 of FIG. 2 showing the hydraulic aligning assembly.

FIG. 7 is an enlarged fragmentary sectional view along line 7—7 of FIG. 2 showing the actuator assembly.

FIG. 8 is a fragmentary schematic of the overall apparatus.

FIGS. 9 through 12 illustrate steps in the operation of the apparatus of this invention.

FIGS. 13 through 16 illustrate four possible ways of aligning a log for sawing using the apparatus of this invention.

DETAILED DESCRIPTION

Figure 1:
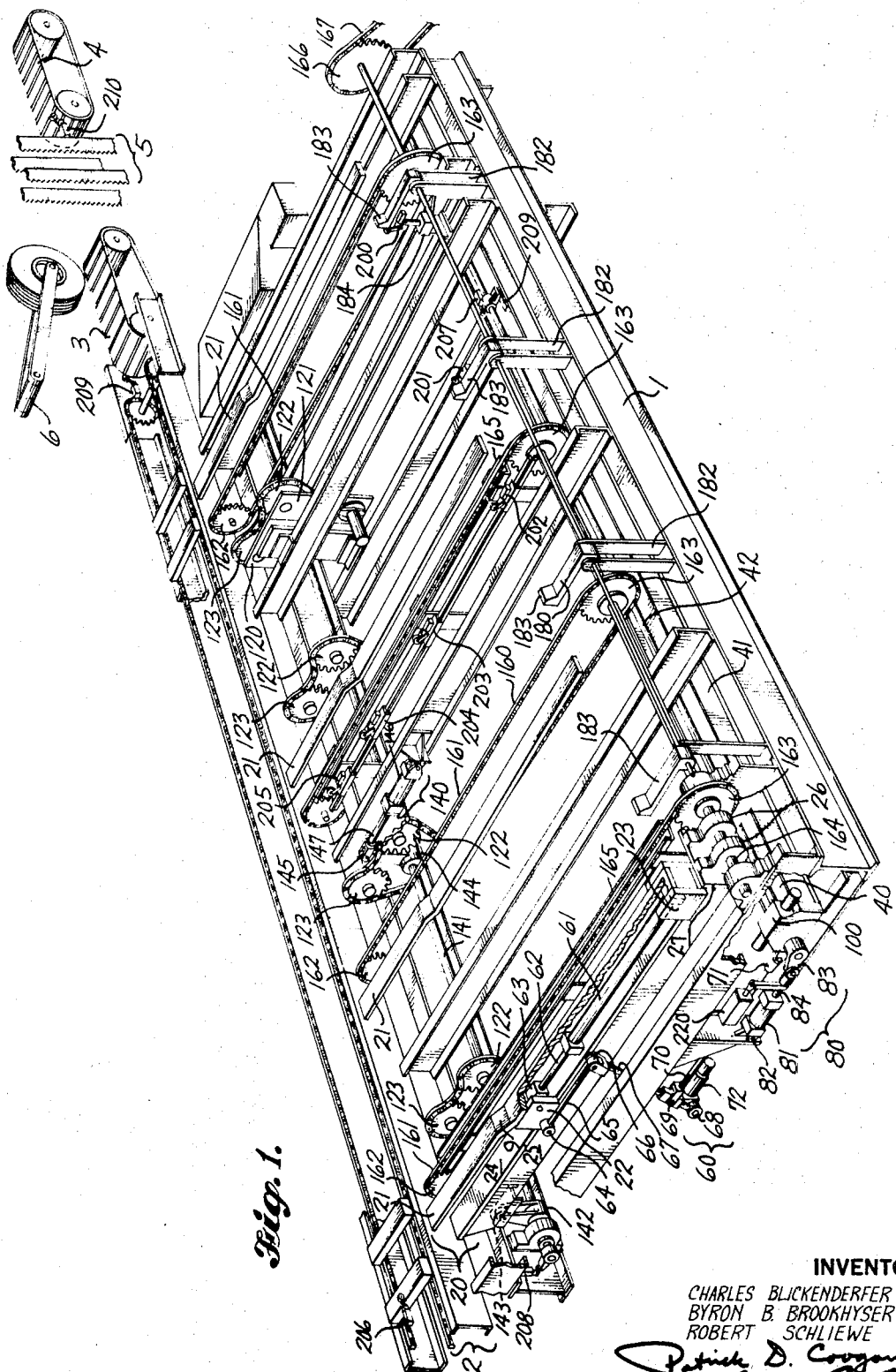
FIG. 1 is a partial perspective view of the overall aligning and transfer mechanism in conjunction with a multiple band saw and the feed conveyors therefor, some parts being broken away for clarification.
Figure 2:
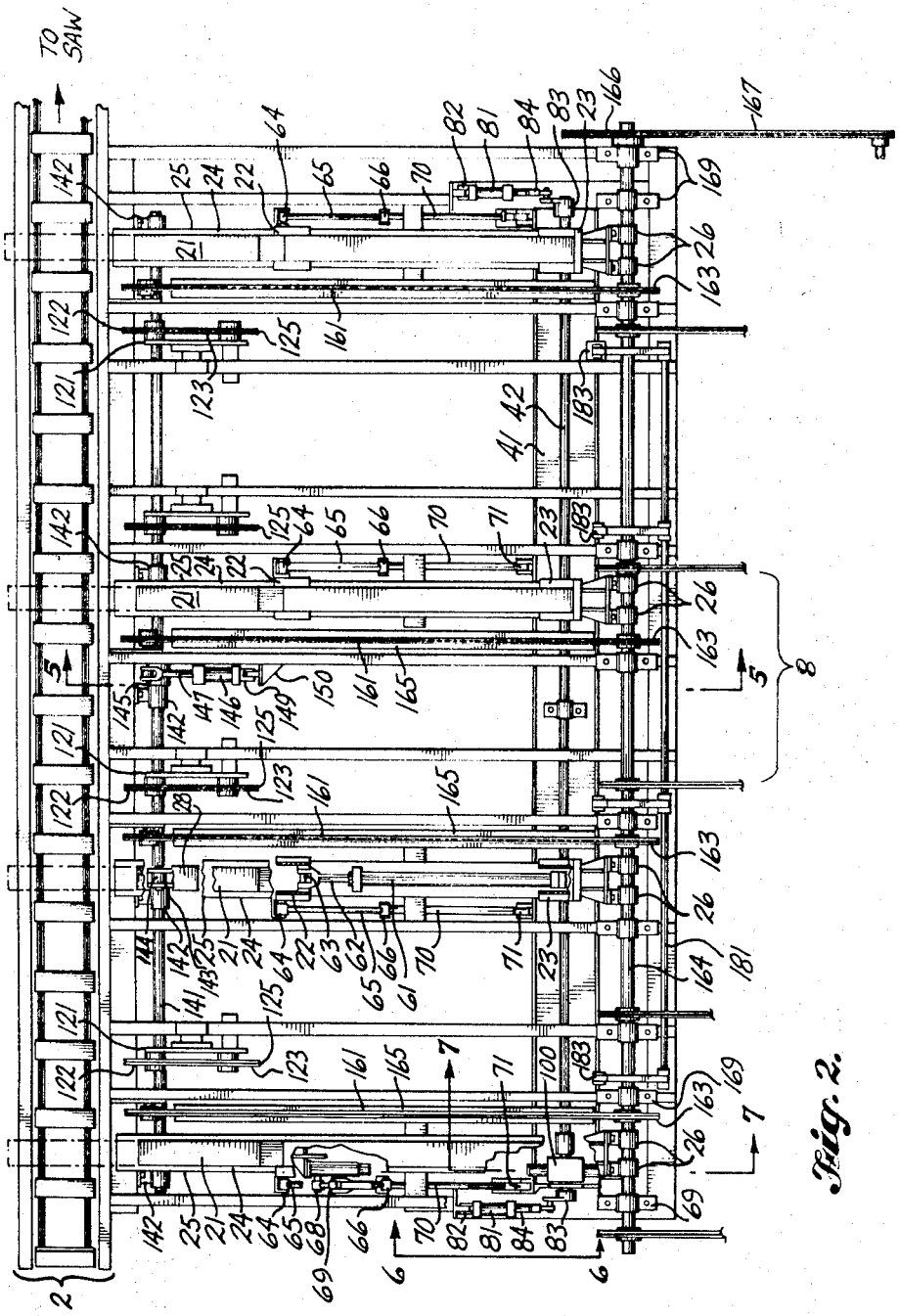
FIG. 2 is a top elevation of the alignment and transfer mechanism with parts broken away.

Referring now to FIG. 1, reference numbers 20, 40, 60, etc., through 180, refer to the overall assemblies of the apparatus. The components of each of these assemblies are broken down by reference numerals under the corresponding broad numeral.

Tracing broadly the process steps to which a log, having first been debarked, is subjected, a log is transferred from an infeed conveyor 8 to conveyor assembly 100 which conveys the log to an alignment position over the ends of the arm members 21 of arm assembly 20 nearest the feed conveyor 2. Cam assembly 140 is then actuated which raises arm assembly 20 above the level of the endless chains 161 and allows the log to rest on the arm members 21 of arm assembly 20. The log is then aligned for sawing by actuation of aligning assembly 80. The aligned log is then transferred to conveyor 2 without loss of alignment by transfer assembly 60, and the aligned log is then fed through the multiple band saw 5. A log turning assembly 120 may be provided beneath the arm members 21 for turning of the logs to a predetermined position for alignment. Also a log stop assembly 180 can be provided to retain logs adjacent the conveyor assembly 160 until they are required for processing.

Referring now in more detail to FIG. 1, 1 designates the overall supporting frame of the apparatus. A conventional slat-bed conveyor 2 is provided onto which the aligned logs are transferred and subsequently fed over conveyor 3 through multiple band saw 5 and over the outfeed conveyor 4. A log hold-down device 6 is used to maintain the assumed position of the cant or log on the bottom chained slats of the slat bed conveyor 2. The top wheel pressure of 6 should be minimum, that is, only that amount sufficient to maintain stability of the log through the cut.

The arm assembly 20 is comprised of arm members 21 slidably mounted on slide 24 by members 22 and 23 which rests atop support member 25. On the bottom side of support member 25 is located trough 28, the function of which will be described later in conjunction with the explanation of cam assembly 140. Supporting member 25 is attached at the end opposite trough 28 to plate 27 and trunnions 26 through which shaft 164 is journaled.

The sliding assembly 40 comprises an elongated bar member 41 slidably mounted on a smooth plate attached to the supporting frame 1. Shaft 42 is journal mounted to bar member 41. A pinion gear 44 (see FIGS. 7 and 8) is positioned for engagement with the actuator assembly to be described later.

Transfer assembly 60 comprises a plurality of double-acting pistons working in hydraulic cylinders 61 located beneath each of the arm members 21. The cylinders are attached to slide 24. Rods 62 extending from hydraulic cylinders 61 are pivotally attached to the arm members 21 through members 22 by linkage 63. Also to members 22 are attached lever arms 65, 67, and 70 by means of linkages 64, 66, and 69. Lever arm 70 is pivoted at 71 to the sliding bar member 41. Lever arm 67 is attached on the end opposite linkages 66 and 69 to the frame 1 by linkage 68. Linkage 68 is not stationary but can be moved horizontally a small distance when a force is exerted on it by movement of sliding bar 41 to which rod 70 is attached. Depending on the direction of the force exerted, valves located in servo mechanism 72 for admitting hydraulic fluid through fluid lines 73 and 74 (see FIGS. 3 and 4) to hydraulic cylinders 61 are opened or closed.

Aligning assembly 80 comprises hydraulic cylinders 81 located on each end of the apparatus adjacent the sliding assembly. Hydraulic cylinders 81 are pivoted at 82 to frame 1. Rods 84 attached to double-acting pistons within hydraulic cylinders 81 and extending therefrom are attached to shaft 42 by means of cranks 83. Movement of the pistons in cylinders 81 results in movement of the sliding bar 41 and corresponding movement of rod 70 which activates servo mechanism 72 by means of the linkage previously described. Fluid is thus admitted to hydraulic cylinders 61, the pistons of which are attached to arm members 21 resulting in movement of the arm members 21 a multiple of the distance moved by sliding bar 41.

The actuator assembly 100 shown in detail in FIG. 7 comprises a pair of opposed hydraulic cylinders 101 within which are mounted pistons 102 and 103 and interconnected by rack 104. Fluid conduits 105 and 106 are provided for admitting fluid to the cylinders 101 resulting in movement of pistons 102 and 103 and corresponding movement of rack 104 in mesh with pinion gear 44 on shaft 42. As shown, the rotary actuator is capable of rotating shaft 42 180°.

The log turning assembly 120 (see FIGS. 1 and 8) comprises plates 121 to which are attached sprockets 122, 123, and hydraulic driven log turning motors 124 all interconnected by endless chains 125. The log turning assembly may be raised and lowered above the level of the arm members 21 by means of fluid operated cylinders 126 (see FIG. 8).

Cam assembly 140 is provided to raise arm assembly 20 and particularly arm members 21 to a predetermined level so that a log resting on the surface of the arm members may be aligned and transferred to conveyor 2 without interference from the log conveyor assembly 160 or portions of conveyor 2. The cam assembly 140 comprises shaft 141 journal mounted to supporting frame 1. Cam members 142 on which rollers 143 are attached are mounted underneath each of the arm assemblies 20 and are engageable with trough 28. The arm assembly is raised or lowered by actuation of the double acting piston within hydraulic cylinder 146 which is pivotally attached to flange 149 affixed to supporting frame 1. Rod 147 extending from the hydraulic cylinder 146 is attached to shaft 141 by means of member 144 and linkage 145.

The log conveying assembly 160 for conveying the logs from an infeed position to a predetermined alignment position comprises endless chains 161 trained about idler sprocket wheels 162 and live sprocket wheels 163. The sprocket wheels 163 are mounted on shaft 164 which is journal mounted to the supporting frame 1. Troughs 165 are provided to prevent the endless chains 161 from being damaged.

Suitable power means (not shown) are used to drive live sprocket wheels 163 through sprocket wheels 166.

The log stopper assembly 180 is hydraulically operated and comprises dogs 183 rotatably mounted on shaft 181, the shaft being supported by ties 182 which are fixed to supporting frame 1. A series of hydraulically actuated cylinders 184 are positioned beneath each of the dogs 183, each independently actuatable to drop dogs 183 and allow a log to fall onto the endless chains 161.

OPERATION OF THE APPARATUS

Operation of the above-described apparatus can be best described by reference to FIGS. 9 through 12.

The logs for processing according to this invention are first debarked. A flat spot is then cut along the entire length of the log by suitable means, so that it will maintain a fixed position on the arm members 21. A first log is fed on infeed chain 8 and is stopped by the dogs 183. The dogs are located so that the log lays on endless chains 161. This allows the infeed chains 8 to be operated independently. The first log held by the dogs 183 may be released by actuation of fluid cylinders 184 which hydraulically drops the dogs 183. The dogs 183 are independently actuatable so that logs of varying length can be accommodated. Limit switches 200 and 201 are positioned adjacent dogs 183 and prevent the dogs from lowering until both are actuated. As soon as the dogs 183 are dropped the endless chains 161 are started by the operator to move the first log forward. A number of limit switches may be attached at varying points along the length of chains 161 in order to space the logs evenly along the length of chains 161. Limit switch 202 (FIG. 1) slidably mounted on the supporting frame 1 is actuated as the first log moves forward, resulting in raising of dogs 183 and starting of infeed chain 8 to bring a second log into position against dogs 183. As the first log continues to move forward, limit switch 203 (FIG. 1) is tripped causing dogs 183 to again drop and allow the second log to follow the first log on endless chains 161. Limit switch 204 acts to stop chains 161 and the logs positioned thereon behind the elevated portion of arm members 21. Limit switch 205 is positioned to stop chains 161 to locate the first log approximately at the center line of the arm members 21 and a predetermined distance from the center line of the slat bed conveyor 2. This process is continued until a number of logs are located on the conveyor chains 161 as shown in FIG. 9. An overriding means may be provided so that the operator can manually adjust the respective positions of the logs.

At this point the operator may choose one or more of several operations. He may use the chains 161 to better locate the logs on arms 21. If the log is not situated on the flat spot provided he may use the log turning assembly 120 to turn the log to the flat side, as shown in FIG. 10. Each of the four log turning assemblies shown are independently operatable so that any desired length can be accommodated. The log is first raised above the level of the infeed chains 161 and the arms 21 by hydraulic means 126 (shown in FIG. 8), then the log turner motors 124 are actuated to turn the log in either direction to locate the flat spot of the log on the arm members 21.

The portions of the arm members 21 nearest the slat bed conveyor 2 are normally positioned at or just below the level of the infeed chains 161 in order that the log can be positioned over the arm members 21 without interference. When the log is in position for alignment, cam assembly 160 is actuated by admitting fluid to the hydraulic cylinder 147. This forces cam members 143 in an upper position as shown in FIGS. 3, 4, and 5, raising the arm members 21 above the level of the chains 161 of the infeed conveyor and the chains of the slat bed conveyor 2.

The log positioned on the arm members 21 is now ready for alignment for sawing.

As shown by FIGS. 13 to 16, the log positioned on the arm members 21 can be aligned with respect to the blades of multiple band saw 5 a number of ways. As shown in FIG. 11 shadow lights 9 are positioned above the arm members 21. Each of the saw blades of multiple band saw 5 is provided with a shadow casting means located a predetermined distance between the center line of flat bed conveyor 2 and the center line of the upending portions of log supporting arm members 21 nearest conveyor 2. The distance between the blades of saw 5 can be adjusted depending on the log to be sawed. Adjustments of the shadow lights are made to suit the new cut required for the log to be sawed. These adjustments are stored in a memory system which sets the blades of the saw as the log approaches the saw. The lights projected onto a log located on arm members 21 extend the full length of the log, thus once the log is located in alignment positions on the arm members 21, the operator may adjust the taper of the log and the method of sawing to achieve the maximum amount of lumber from a given log.

Alignment of the log is accompanied by actuating the two fluid operated cylinders 81 located on each end of the sliding means 41. As the piston within cylinder 81 is advanced or retracted sliding means 41 is accordingly advanced or retracted by reason of its attachment to rod 84 connected by crank 83 to shaft 42. By advancing the piston on one side of sliding bar 41 and retracting the piston on the other side the sliding means 41 can be canted a suitable distance. Movement of the sliding means 41 exerts a force on horizontal rod 70 which transmits the force by way of linkage 67 and 65 to arm members 21. In addition, a force is also exerted on linkage 68 causing sufficient movement of the linkage to actuate servo mechanism 72 which allows fluid to be admitted to hydraulic cylinders 61 resulting in movement of arm members 21. Without the servo mechanism 72 the arm members could not be effectively moved by the linkage as shown. The linkage 68 is spring loaded so that a predetermined amount of force is required to push or pull the linkage forward or backward. As force is exerted on rod 70 it tends to push linkage 68 forward opening fluid outlet 73 and allowing fluid to enter into hydraulic cylinders 61 which pull arm members 21 a greater distance forward than the distance moved by sliding means 41. The ratio of movement between arm members 21 and sliding means 41 may be adjusted to any ratio, depending on the distance between the center line of the arm members 21 and the center line of the slat bed conveyor 2 with which band saw 5 is aligned. Normally the aligning cylinders on each end of the sliding means 41 are operated in opposed relation. That is as the piston on one end is advanced the corresponding piston on the other end is retracted, thus allowing the log located on forks 21 to be tapered in a suitable direction for sawing. Arm members 21 move in proportion to each other by reason of their connection to bar member 41, thus minimizing the chance of slippage of the log riding on each of the arms 21. Once the taper of the log is set, the log is ready for transfer to the slat bed conveyor 2 for feeding through multiple band saw 5.

Transfer of the log from arm members 21 to the bed of the slat bed conveyor 2 takes place by actuation of the third power means 100 shown in detail in FIG. 7. As shown in FIG. 7 the full travel of pistons 102 and 103 rotates gear 44 attached to shaft 42 180°. A suitable device for accomplishing this is Model #1500, Rotary Actuator, sold by Flo-Tork, Inc. The "rotary actuator" is mounted on the sliding means 41. As shaft 42 is rotated the locked positions of the pistons within hydraulic cylinders 81 act as pivot arms. Cranks 83 attached to shaft 42 and to rods 84 extending from hydraulic cylinders 81 are rotated 180° by corresponding rotation of shaft 42 thus pulling bar member 41 forward. Again, as the bar member 41 is moved the same mechanism described previously acts to move the arm members 21 a corresponding multiple of the distance traveled by the bar member 41. The bar member 41 during the transfer operation, however, is moved an equal distance forward along its entire length which in turn moves each of the arm members 21 forward an equal distance. This does not disturb the alignment of the log resting on the surface of arm members 21. As explained previously, as the bar member 41 moves forward it exerts a force on rods 70 which in turn causes valve means to open in servo mechanisms 72, admitting fluid to cylinders 61 and moving arm members 21 a corresponding multiple of the distance moved by sliding means 41.

Limit switch 206 (FIG. 1) located on slat bed conveyor 2 senses the position of the slats on the conveyor and stops the conveyor at a position such that the arm members 21 can freely travel between the slats during transfer of the log from the surface of the arm members 21 to the slat bed conveyor 2. Limit switch 207 (FIG. 1) senses the extended position of arm members 21 as shown in FIG. 12 and actuates the piston of hydraulic cylinder 146 dropping rollers 143 from beneath arm supporting members 25. This drops arm members 21 between the slats of the slat bed conveyor 2 and allows the aligned log supported by arm members 21 to come to rest on the slat bed conveyor without loss of alignment. At the same time the arm members 21 are lowered, limit switch 208 (FIG. 1) senses the lowered position of the arm assembly and actuates power assembly 100 which results in retraction of the arm members to their initial position. A self-centering mechanism 220 is provided to center the alignment of the pistons within cylinders 81 and correspondingly arm members 21 during the return stroke. Limit switch 209 (FIG. 1) senses the return position of arm members 21 and actuates slat bed conveyor 2 which feeds the aligned log through saw 5. Limit switch 209 (FIG. 1) may be provided to sense the log moving through saw 5 and prevent forward movement of arm members 21 until the log clears the conveyor 2 and the conveyor has come to a stop. Also limit switch 210 may be provided to sense when the saw blades are clear so that the saw apparatus may be reset for the next log.

The multiple band saw referred to in FIG. 1 is a standard commercially available apparatus. The positions of the saw blades can be adjusted for sawing various sizes of boards. As the saw blades are adjusted for sawing a particular size log, the corresponding shadow lights 9, depicted in FIG. 11, are moved accordingly so that the position of the lights extending the length of the log indicates the exact direction which the saw blades will take once the log is transferred from the arm members 21 to the slat bed conveyor 2.

It will be seen that by the preceding description of the method of operation and the apparatus itself that an apparatus has been provided which positions logs accurately and rapidly to a predetermined position, this position held until the aligned log is fed through the saw apparatus.

It is to be understood that the invention shown and described is to be taken as the preferred embodiment and that various changes and shapes, size and arrangement may be resorted to without departing to the spirit of the invention or the scope of the enclosed claim.

What is claimed is:

1. A method for maximizing the yield of useful lumber from small logs and for delivering them one at a time to a multiple band saw apparatus which comprises:
   (a) debarking the logs,
   (b) providing a flat spot extending the full length of the bottom of the log,
   (c) transferring the log to an alignment position,
   (d) selecting a method of sawing the log to yield an optimum amount of useful timber by reference to shadow lights which cast a line throughout the length of the log indicating the lines of cut of the multiple band saw, the adjustment of the shadow lights adjusting the distance between the saw blades of the multiple band saw apparatus,
   (e) aligning the taper of the log for sawing by reference to the same shadow lights so that the lines of cut of the saws extend substantially the entire length of the log,
   (f) transferring the log from the alignment position to sawing position without substantial alteration of the alignment of the log, and
   (g) feeding the aligned log through the multiple band saw while holding the log firmly against movement.

References Cited

UNITED STATES PATENTS

| | | | |
|---|---|---|---|
| 3,184,034 | 5/1965 | Stuller et al. | 143—92 XR |
| 3,456,700 | 7/1969 | Ahlstedt | 144—312 |
| 3,459,246 | 8/1969 | Ottosson | 144—312 |

GERALD A. DOST, Primary Examiner

PO-1050
(5/69)

UNITED STATES PATENT OFFICE
CERTIFICATE OF CORRECTION

Patent No. 3,519,045          Dated July 7, 1970

Inventor(s) C. BLICKENDERFER, JR., ET AL

It is certified that error appears in the above-identified patent and that said Letters Patent are hereby corrected as shown below:

In column 2, line 51, "100" should read --160--;

in column 5, line 22, "flat" should read --slat--;

in column 5, line 27, "new" should read --saw--; and in column 5, line 36, "accompanied" should read --accomplished--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents